United States Patent [19]

Baran et al.

[11] Patent Number: 5,348,453
[45] Date of Patent: Sep. 20, 1994

[54] POSITIVE DISPLACEMENT SCREW PUMP HAVING PRESSURE FEEDBACK CONTROL

[75] Inventors: Mark E. Baran, Neenah; David P. Phibbs; Vern W. Couch, both of Appleton, all of Wis.; George W. Michalec, Pleasantville, N.Y.

[73] Assignee: James River Corporation of Virginia, Richmond, Va.

[21] Appl. No.: 8,871

[22] Filed: Jan. 25, 1993

Related U.S. Application Data

[60] Division of Ser. No. 928,655, Aug. 17, 1992, abandoned, which is a continuation of Ser. No. 634,455, Dec. 24, 1990, abandoned.

[51] Int. Cl.$^5$ .......................... F04B 21/02; F04C 2/16; F04C 15/04
[52] U.S. Cl. ........................ 417/440; 418/15; 418/201.2; 418/202
[58] Field of Search .................... 418/15, 201.1, 201.2, 418/202; 417/440

[56] References Cited

U.S. PATENT DOCUMENTS

| | | | |
|---|---|---|---|
| 985,562 | 2/1911 | Williams | 418/151 |
| 3,088,658 | 5/1963 | Wagenius | 418/201.2 |
| 3,589,843 | 6/1971 | Zalis | 418/202 |
| 3,620,655 | 11/1971 | Arnegard | 418/151 |
| 3,716,449 | 2/1973 | Gatward et al. | 162/101 |
| 3,871,952 | 3/1975 | Robertson | 162/101 |
| 3,937,273 | 2/1976 | Radvan et al. | 162/212 |
| 3,938,782 | 2/1976 | Robertson | 259/4 R |
| 3,947,315 | 3/1976 | Smith | 162/101 |
| 4,443,297 | 4/1984 | Cheshire et al. | 162/101 |
| 4,443,299 | 4/1984 | Cheshire et al. | 162/264 |
| 4,488,932 | 12/1984 | Eber et al. | 162/9 |
| 4,498,956 | 2/1985 | Cheshire et al. | 162/101 |
| 4,543,156 | 9/1985 | Cheshire et al. | 162/101 |
| 4,686,006 | 8/1987 | Cheshire et al. | 162/336 |
| 4,764,253 | 8/1988 | Cheshire et al. | 162/198 |
| 4,869,782 | 9/1989 | Nelson et al. | 162/9 |

FOREIGN PATENT DOCUMENTS

| | | | |
|---|---|---|---|
| 62-291486 | 12/1987 | Japan | 418/151 |
| 63-32183 | 2/1988 | Japan | 418/151 |

OTHER PUBLICATIONS

"Development of a Twin-Screw Pump for Multiphase Duties" by P. J. Dolan, R. A. Goodridge and J. S. Leggate, SPE Production Engineering, Feb. 1988.

"Sheet Formation & Printability," by B. Radvan et al, presented at the 14th EUCEPA Conference in Oct., 1971.

"Wet-Laid, Long Fiber Formers," by A. P. J. Gatward, published in *Paper Technology*, vol. 13, No. 4, dated Aug., 1972.

"The Structure and Properties Of Paper Formed By a Foaming Process," by M. K. Smith et al, *TAPPI*, vol. 57, No. 1, Jan., 1974.

"Long-Fibre Developments in U.K. & Europe," by A. P. J. Gatward, published in *Paper Technology*, vol. 14, No. 5, Oct., 1973.

"New Developments In The Radfoam Process," by R. W. Tringham, published in *Paper Technology*, Oct., 1974, vol. 15, No. 5, pp. 288–294.

*Primary Examiner*—John J. Vrablik

[57] ABSTRACT

Improvements in screw pumps, and especially positive displacement pumps, are disclosed. The clearance between the screw flight and the bore is increased over an increased period. The screw is balanced at preferred locations on the flight. Wear hard material such as tungsten carbide is emplaced on a portion of the outer surface of the screw flight. A wear measurement port extends from the outside surface of the pump to the inner surface of the bore. Pressure regulating ports and controls provide an active pressure feedback control system to control the feeding of pressure from the outlet end of the screw back toward the inlet end of the screw. Pump wear, and pressure pulsations in the operation of the pump are thus reduced. The wear measurement port enables a method of monitoring wear on the pump screw during operation without disassembling the pump, namely by manipulating a wear measurement device through the port. The wear measurement device can be a proximity sensor which can be connected to a monitor. The wear measurement port can be sealed with the proximity sensor in place in the port, such that wear of the screw can be monitored while the pump is operating.

5 Claims, 2 Drawing Sheets

POSITIVE DISPLACEMENT SCREW PUMP HAVING PRESSURE FEEDBACK CONTROL

This application is a divisional of copending application Ser. No. 07/928,655, filed on Aug. 17, 1992, now abandoned, which is a continuation of application Ser. No. 07/633,455, filed on Dec. 24, 1990, now abandoned.

BACKGROUND OF THE INVENTION

This invention relates to pumps and pumping methods. It especially relates to positive displacement screw pumps which are operated at high pump speeds in pumping low viscosity liquids, and various multi-phase fluid mixtures of liquids, gases, and solids especially in large volumes.

As used herein, high speed operation of a positive displacement screw pump means operation at speeds of at least 500 revolutions per minute (rpm), preferably at least 900 rpm, and most preferably at least 1200 rpm. It is anticipated that pumps disclosed herein can be operated at sustained speeds between about 1500 rpm and about 1900 rpm.

It is known to use positive displacement pumps, having counter-rotating twin screws, for pumping higher viscosity products, such as pastes, creams, oils and the like.

In the papermaking art, it is known to use pumps for pumping two and three phase media which are part liquid and part gas, for example foamed liquid containing 50 to 80 percent air by volume, which optionally include some solid material. Foamed fiber furnishes containing solid cellulosic fibers for use in papermaking processes are well known as disclosed, for examples, in U.S. Pat. No. 4,443,297 to Cheshire et al, herein incorporated by reference. Pumping of such multi-phase foam media has presented a plurality of problems as the pump speed, the volume of flow, and outlet pressure have been increased. Using conventional pumps, the increase in flow volume has not corresponded well with increase in speed of the pump because of the compressibility of the foamed media.

Accordingly, in order to achieve efficient pumping at higher volumes and higher pump speeds, applicants have found it expedient to use a positive displacement pump for pumping such foamed media. Such pumps have conventionally been used for pumping higher viscosity products, generally products which provide some fluid lubricity between the stationary pump casing and the moving impeller (e.g. screw).

An advantage of such positive displacement pumps is that they generally create isolated batches of the media being pumped, isolating the batches essentially at, or near, the inlet pressure, whereby batches of foamed media are susceptible to being pumped from the inlet to the outlet in essentially predictable volume, wherein the volume pumped, as measured at the pump inlet, is essentially linearly related to the speed of operation of the pump.

Applicants have found that, when pumping the above mentioned foamed media the pumping operation creates pressure pulses which are transmitted through the outlet of the pump. Essentially, the fluid in a isolated pumping cell is at a pressure below the outlet pressure of the pump. Upon reaching the outlet, the fluid at the outlet suddenly rushes into the open cell and compresses the fluid in the cell. The sudden rushing of the fluid into the newly opened cell causes a rapid, temporary, pressure change at the pump outlet. This pressure change is transmitted out of the pump, through the pump outlet, as a pressure pulse in the fluid in the enclosed pressurized system downstream of the pump.

While such pressure pulses are of little consequence in operations which comprise only transfer of the media, where the output of the pump is intimately connected with the formation of the web in a papermaking process, such pressure pulses directly affect the uniformity of flow of furnish onto the paper-making fabric, and accordingly, the uniformity, in the machine direction, of the paper so made.

Applicants have also found that some conventionally-produced screw type positive displacement pumps experience excessive rates of wear when operated for sustained periods at their rated speed of 900 rpm for pumping the above recited three phase media, containing about 1% to about 4% by weight cellulose fiber. For example, a typical such pump, having a designed clearance of 0.020 inch (0.5 mm.) between the rotating pumping screw and the stationary bore, had a measured clearance of 0.040 inches (1.0 min. ) after sustained operation for only three hours.

It is an object of this invention to provide improved screw pumps which can withstand high speed operation over extended periods of time with substantially reduced wear between the stationary and the rotating members.

It is another object to provide means to measure the wear of the pump parts without disassembling the moving member from the stationary member.

It is a further object to provide means to monitor the wear of the pump parts over time without disassembling the moving member from the stationary member.

It is another object to provide a method of monitoring the wear of the pump parts without disassembling the moving member from the stationary member.

It is still another object to provide pumps which can pump low viscosity fluids at high speed operation with lower amplitude pressure pulses.

It is yet another object to provide pumps which can pump low viscosity fluids at high speed operation with lower rates of change of pressure.

It is still another object to provide a method of pumping low viscosity fluids at high speed operation with lower amplitude pressure pulses.

It is a further object to provide a method of pumping low viscosity fluids at high speed operation with lower rates of changes of pressure.

It is yet another object to provide a method of balancing a screw for a screw pump without increasing the leakage between the higher pressure outlet end of the screw and the lower pressure inlet end of the screw, at the loci of removing material for achievement of balance, or otherwise reducing the pumping capacity of the screw over a typical 360 degree rotation of the screw; and without significantly weakening the screw.

SUMMARY OF THE DISCLOSURE

Certain of the objectives are achieved in a family of positive displacement pumps, comprising an outer casing, and first and second pumping screws. The outer casing comprises an inlet, an outlet, and internal passage means adapted to convey material between the inlet and the outlet. The pumping screws have first portions contained in the passage means. The passage means has an inner surface adjacent the pumping screws, portions of the inner surface defining a space therebetween, the space comprising a bore. Each pumping screw has a minor circumference defined by a central shaft, and a major circumference defined by at least one screw flight. A second portion of each of the pumping screws is contained in the bore over a length of the bore wherein the bore and the flight are coextensive. The screw flight extends radially and longitudinally about the shaft, and outwardly from the shaft, to an outer surface of the flight, at least a portion of the outer surface being defined in the major circumference. Front and rear surfaces of the flight extend between the shaft and the outer surface, and define a thickness of the flight there-between. Each flight has a height, as measured between the shaft and the outer surface. The screw flights are secured to the respective shafts and have inlet and outlet ends. Each screw flight terminates at the outlet end thereof.

Certain of the objectives are obtained in a family of positive displacement pumps, also comprising an outer casing and first and second pumping screws, the casing comprising an inlet, an outlet, and the internal passage means. The pumping screws have the same minor and major circumferences, and the same general arrangements of the flights on the shafts. The passage means comprises the bore, having an inner surface, and adapted to receive portions of the pumping screws. The flights are similarly received in the bore with similar clearances. First and second bearings mount each of the pumping screws to the casing at spaced locations thereof. The flights are disposed between the bearings. The screws comprise one or more balancing holes in corresponding flights thereof, the balancing holes being disposed on surfaces of the flights, and being adapted to reduce any tendency of the screws toward imbalance, the balancing holes being disposed on, or below, surfaces such that they will not materially reduce the pumping capacity of the pump.

The balancing holes may be plugged with material having a density less than the average density of the respective ones of the flights. The holes are preferably capped and ground such that the outer surface of the flight is continuous and smooth over the holes.

Certain of the objectives are achieved in a more generically defined screw pump comprising an outer casing and a screw. The outer casing comprises an inlet, an outlet, and internal passage means adapted to convey material between the inlet and the outlet. The pumping screw has a minor circumference defined by a central shaft, and a major circumference defined by at least one screw flight. The screw flight extends radially and longitudinally about the shaft, and outwardly from the shaft, to an outer surface of the flight, at least a portion of the outer surface being defined in the major circumference. The passage means comprises a bore adapted to receive at least a portion of the pumping screw, the bore comprising an inner surface. A first portion of the flight is received in the bore over a length of the bore wherein the bore and the flight are coextensive. The clearance between the outer surface of the flight and the inner surface of the bore is sufficiently small as to promote efficient pumping of material through the bore by the screw. A wear measurement port extends through the outer casing, from an outer end thereof on the outside surface of the pump to an inner end thereof at the inner surface of the bore propinquant the major circumference defined by the outer surface of the screw, upon rotation of the screw. The wear measurement port is positioned such that a portion of the outer surface of the flight can be disposed adjacent the inner end of the port, whereby a measurement device can be manipulated in or through the port, and the wear of the screw can thus be measured.

The screw and the outer casing preferably include indicators which indicate that angular position of the screw at which the outer surface is disposed in measurement position at the wear measurement port.

In preferred embodiments within this family, a proximity sensor is disposed in the wear measurement port, and means for transmitting a signal generated by the proximity sensor extends from the proximity sensor and the wear measurement port, the wear measurement port being closed and sealed sufficient for normal operation of the pump.

Certain of the objects of the invention are achieved in a screw pump, preferably a positive displacement pump wherein the flights comprise elongate hardened wear strips as components of the outer surfaces of the flights, each wear strip having a width corresponding in direction to the corresponding width of the corresponding one of the outer surfaces, less than 50% of the width of a given length portion of the outer surface being comprised of the wear strip.

In some embodiments, a portion of the wear strip is preferably overlain by the softer material comprising the main body of the corresponding one of the screws, the overlying softer material being adapted to hold the wear strip against movement out of the flight in a direction perpendicular to the longitudinal axis of the screw both before and after initial wear of the wear strip at a surface thereof corresponding to the outer surface of the screw.

In some embodiments, the widths of the wear strips vary along the lengths of the flights such that the width of a given wear strip at a given locus is related to the potential amount of wearing contact at the locus between the respective one of the outer surfaces and the bore. In those embodiments where the width of the strip varies according to location on the flight, the wider widths of the wear strips can encompass greater than 50% of the width of the outer surface at a given locus, up to 100%, especially adjacent the outlet end of the flight at loci where the width of the flight is tapering toward the zero thickness at the outlet end of the flight.

Certain objects of the invention are achieved in a method of monitoring wear in a screw pump. The method comprises the steps of selecting an appropriate screw pump having a port therein suitable for receiving a wear measurement device, manipulating a measuring device through the port, and measuring the wear of the respective one of the screws, using the measuring device as manipulated through the port. In the pump so used, the port is positioned such that a portion of the outer surface of the respective flight can be disposed adjacent the inner end of the port, along a longitudinal axis extending along the length of the port, whereby a measuring device can be manipulated through the port and the wear of the screw can thus be measured.

In some embodiments, the wear measurement port has a plug in it, and the method comprises, between the steps of selecting the pump and manipulating the measuring tool therethrough, the steps of operating the pump, stopping the operation of the pump, and removing the plug.

In a preferred embodiment, a preferred wear measurement device is a proximity sensor, and the method comprises emplacing the proximity sensor in the port, sealing the port closed, operating the pump by turning the screws with the proximity sensor so emplaced, and sensing dynamic changes of proximity of the flight to the sensor.

Still others of the objects are achieved in a method of balancing screws used in the pumps. The method of balancing the above described screw comprises the steps of determining the locus and amount of imbalance of the screw; and removing material from the flight, in correcting the imbalance, along that portion of the flight which is between the bore and the bearings.

Certain of the objects are achieved in methods of controlling the amplitude and/or the rate of change of pressure pulses in a low viscosity pumping operation, wherein the viscosity is no greater than 5 centipoise, and wherein a positive displacement screw pump, as described above, is used, and is operated at high speed, whereby the pump has an operating inlet pressure and an operating outlet pressure. The pumping cells between facing portions of the front and rear surfaces of the flight have cross-sections defined between the major and minor circumferences. Individual batches of the material being pumped are substantially isolated, in the pumping cells, from both the outlet pressure and the inlet pressure during traverse of the screw by the batches between the inlet and the outlet. The individual batches of material are sequentially opened to the outlet pressure during operation of the pump and the associated pumping of the material.

The method of controlling the pressure pulses in the last described operation comprises opening the cells to the outlet pressure by creating an opening between a respective cell and the outlet, wherein the cross-section of the opening is at least as great as the cross-section of the cell, over a period of time greater than the time during which, at the speed of operation of the pump, the flight traverses an arc, as measured transverse to the shaft, wherein the cross-section of the space defined between the arc at the major circumference and the shaft is equal to the cross-section of the corresponding pumping cell.

Preferably, the cells are opened over a period of time at least two times, more preferably at least six times, in some embodiment preferably at least ten times, and up to at least fifteen times, as great as the time during which the flight traverse the arc.

DETAILED DESCRIPTION OF THE ILLUSTRATED EMBODIMENTS

Figure 1:
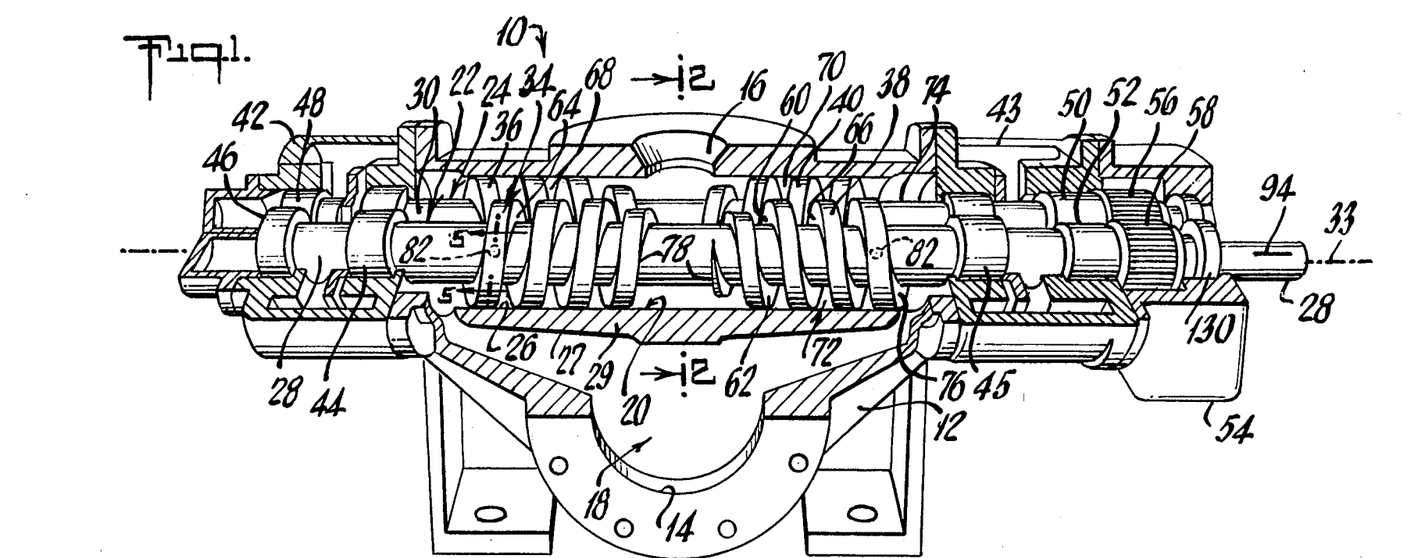
FIG. 1 shows a front view of a pump of the invention with portions cut away.
Figure 2:
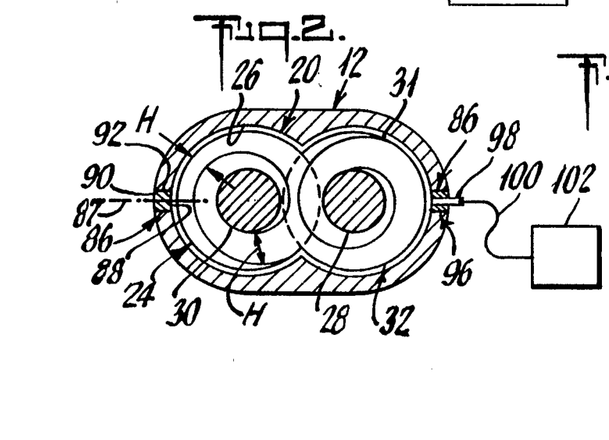
FIG. 2 shows a transverse cross-section of a portion of the pump, and is taken at 2—2 of FIG. 1.

Turning now to FIGS. 1 and 2, a pump 10 has an outer casing 12, including an inlet 14, an outlet 16, and internal passages generally designated 18, traversing the casing 12 between inlet 14 and outlet 16. Internal passages 18 include a bore 20 adapted to receive therein a pair of pumping screws 22 and 24. The cross-section of bore 20, and thus the space defined therein, is defined at any given point along its length by an inner surface 26. The bore 20 further comprises an outer surface 27, and a wall 29 between inner and outer surfaces 26 and 27.

Pumping screws 22 and 24 comprise minor circumferences defined by shafts 28 and 30 respectively. Each shaft has a longitudinal axis 33 extending along the length thereof. Screws 22, 24, further comprise major circumferences 31 defined by the outer surfaces 32 of helical screw flights 34, 36, 38, and 40, at the maximum circumferences of those flights. In the embodiments illustrated, each shaft has an attached pair of flights disposed toward opposing ends thereof.

Stuffing boxes 42 and 43 are attached to opposing ends of outer casing 12 and contain stuffing seals 44 and 45. The stuffing boxes 42 and 43 support screws 22 and 24 on bearings 46, 48, 50 and 52, the seals 44 and 45 being disposed between the bearings and the pumping chamber which is generally defined by internal passages 18. The bearings and seals can, of course, be reversed in position for use in pumping material which is adapted to lubricate the bearings.

A gear box 54 is mounted to the right end of the right stuffing box 43 and houses gears 56 and 58 which are preferably integral parts of the respective screws 22, 24 as illustrated. Gears 56, 58 are arranged with the teeth of gear 56 meshed with those of gear 58 such that the rotation of shaft 28, by a motor or other prime mover (not shown), causes counter-rotation of the screws 22, 24 whereby one of the screws 22, 24 rotates clockwise and the other screw rotates counter-clockwise.

Each of the screw flights extends radially and longitudinally about the respective shaft, and extends outwardly from the shaft to the outer surface 32 of the respective shaft. Each flight comprises a front surface 60 disposed toward outlet 16 and a rear surface 62 disposed away from outlet 16, front and rear surfaces 60 and 62 defining the thickness of the respective flight therebetween at any point along the length of the respective flight. At any point along a given flight, the flight has a height "H" as measured between the respective shaft 28 or 30 and the respective outer surface 32.

Pumping cell spaces 64 and 66 are defined between facing portions of the front and rear surfaces of respective flights 34 and 38, between the shaft 28 and the outer surfaces 32 of the flights 34 and 38. Pumping cell spaces 68 and 70 are defined between facing front and rear surfaces of respective flights 36 and 40, between the shaft 30 and the outer surfaces 32 of flights 36 and 40.

As seen by the combined teachings of FIGS. 1 and 2, the flights 34, 36 and 38, and 40 of the screws 22, 24 are meshed between shafts 28, 30, by the design and positioning of the screws, such that the flights 34, 38 on screw 22 reach into the pumping cell spaces 68, 70 on screw 24, essentially closing off the cell spaces 68, 70 between the shafts 28 and 30. Similarly flights 36, 40 on screw 24 reach into the pumping cell spaces 64, 66 on screw 22, essentially closing off the cell spaces 64, 66 between shafts 28 and 30. The thicknesses of the flights and the spacing of the corresponding front and rear surfaces (the width "W" of the cell spaces of FIG. 3) on the adjacent flights at the meshed screws are small enough that the flight of one screw serves as an effective closure of the cell spaces of the opposing screw at the loci where the screws are meshed between their shafts.

The clearances between the outer surfaces 32 of the respective flights and the bore 20 are small enough, and comprise enough length of bore 20, to promote efficient pumping of a low viscosity material, such as water, a foamed liquid containing, e.g. 50% to 80% air by volume, and the same media when including papermaking fibers dispersed therein. Typical clearances are between about 0.02 and about 0.04 inch (about 0.5 to about 1.0 mm.). The typical seal clearance is normally effective over at least one turn of each flight, thereby effectively isolating the inlet end of the flight from the outlet pressure at the outlet end of the flight.

The closure of the pumping cell spaces 64, 66, 68 and 70 by the meshing of the screws between shafts 28 and 30 creates at least one, and preferably a plurality of isolated and distinct pumping cells 72 at each flight on each screw. Each pumping cell 72 is defined within a pumping space (e.g. 64) between facing front and rear surface portions 60, 62 between the respective shaft (e.g. 28) and the adjacent inner surface 26 of the bore 20, about generally one turn of the pumping cell space (e.g. 64) between consecutive extensions of the opposing flight (e.g. 36) into the pumping cell at the locus of meshing of the screws. Accordingly each pumping cell extends approximately one turn (a bit less) about the shaft between adjacent turns of the corresponding flight. The cell has a beginning and an end where the screws are meshed. Accordingly, the pumping cell is isolated from the inlet, from the outlet, and from the other cells. Upon turning of the screw (e.g. 22) in the pumping direction, the pumping cells are advanced along the screw toward the outlet 16 at the center of screw 22.

The portions 74 of the screws which are in internal passages 18 comprise the portions between the seals 44 and 45. The portions 74 include first lengths over which the screws and the bore are coextensive (inside bore 20) and second lengths between bore 20 and the respective seals 44, 45.

Each screw flight 34, 36, 38, 40 begins at an inlet end 76 disposed toward the respective stuffing seal 44 or 45 and ends at an outlet end 78 disposed toward outlet 16. Outlet end 78 is preferably configured as in FIGS. 1 and 2, to reduce the pressure pulses in the pumped fluid. The clearance between the outer surface 32 of the flight and the inner surface 26 of the bore may be increased to the outlet end 78 of the flight over a portion of the coexistent length of the bore and the screw along the longitudinal axis of the shaft of the respective screw.

The embodiment illustrated in FIGS. 1 and 2 shows an increase in the clearance between the outer surface of the flight, at outlet end 78, and the inner surface 26 of the bore, over a full turn of 360 degrees of the flight on the shaft (FIG. 2).

The progressive increase in the clearance between the outer surface 32 of the flight and the inner surface 26 of the bore represents a progressive (gradual) opening of the pumping cell to the operating pressure at the outlet 16 of the pump, whereby the pulsating affect of the opening of the cell is spread over a longer period of time than if the height of the flight came to an end, from its full height at the major circumference, over a shorter distance during high speed operation of the pump, which can develop about 50 psi pressure difference between the pump outlet and the pump inlet even at the lower speed of 900 rpm when pumping paper making furnishes based on water or foamed liquid as herein disclosed.

Figure 3:
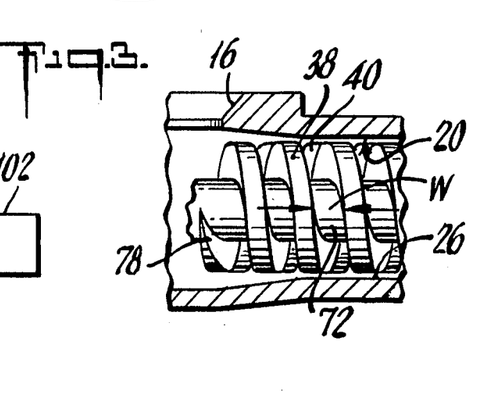
FIG. 3 is a fragmentary cross-section showing an alternative combination of bore and screw, to achieve reduced pressure pulsation effect.

The provision of the progressive increase in clearance is illustrated in FIGS. 1 and 2 as a progressive decrease in height "H" of the screw flights at the outlet ends 78 of the flights, the size of the bore 20 being kept constant. FIG. 3 illustrates another method of achieving the increase in clearance, namely an increase in the cross-section of bore 20 adjacent the outlet end of the flight, while the height "H" of the flight is maintained constant to outlet end 78, in accordance with the respective major circumference 31, or is tapered in height over a relatively shorter distance.

Both changes may, of course, be made, whereby the height of the flight is progressively reduced and the cross-section of the bore is changed (increase or decrease) to accommodate the desired rate of change in the clearance.

At the higher speeds of operation contemplated for the pumps of this invention, any imbalance in the screws will be evidenced by vibration and wear in the screws and bores of the pump. Accordingly the screws are preferably balanced. The balancing is accomplished by defining the angle of imbalance (the radial angle about the shaft whereat the screw is heavy) and removing an appropriate amount of material from the flights, to reduce that imbalance, at the appropriate radial angle, at locations, and in such ways, that the instantaneous efficiency of the ongoing pumping operation will not be reduced.

Figure 5:
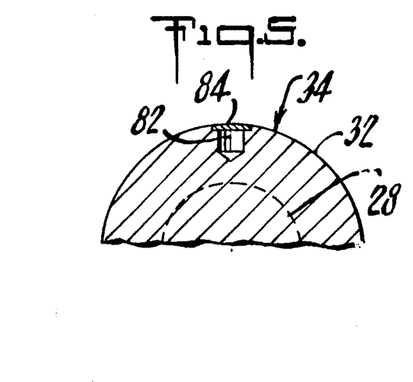
FIG. 5 shows a cross-section of a balancing hole and is taken at 5—5 of FIG. 1.

Preferred locations for removing material are shown in FIG. 1. Hidden holes 82 are located at distances approximately 25% (and respectively 75%) of the distance between the bearings 46, 52, whereby they reduce the tendency of the screw to set up a standing one-cycle sine wave vibration. Holes 82 are generally made by removing the calculated amount of material with a drill. As illustrated in FIGURE 5, the holes 82 are preferably capped with a cap 84 which is welded in place over the hole, after which the cap 84 is machined or ground flush so that it becomes an integral part of the outer surface 32 of the flight. Accordingly, the balancing holes 82 do not penetrate outer surface 32, and thus have no affect on the ability of the outer surface 32 to create isolated pumping cells with appropriate control of fluid leakage between outer surface 32 and inner surface 26 of bore 20.

As seen in FIG. 2, wear measurement ports 86 extend through outer casing 12, from inner ends 88 thereof at inner surface 26 to outer ends 90 thereof at the outside surface of the pump. Ports 86 have longitudinal axes 87, and are closed by removable plugs 92 which maintain the seal of the pump during normal pump operation. The simplest plug 92 (left side in FIG. 2) is typically threaded, and is removed when the pump is out of service, whereupon a measuring tool is manipulated through the port 86 and against the outer surface 32 of the respective flight. For such use, it is necessary that the screw be positioned such that the outer surface 32 is aligned with the hole 86, between hole 86 and the shaft of the screw. Preferably the shaft 28 and the outside of the gear box, or other appropriate stationary surface, are marked at matching locations thereof, as at 94 on shaft 28, such that alignment of mark 94 on shaft 28 with the matching mark on the outside surface of the gear box brings the outer surfaces 32 of the flights into alignment with the wear measurement ports 86 which are so used.

The port 86 indicated on the right side of FIG. 2 is closed by a plug 96 which includes a dynamic proximity sensor 98, connected by signal carrier 100 (e.g. wire cable) to a monitoring device 102. Plug 96 is in place in port 86 while the pump is in operation. Upon each rotation of the respective screw, the outer surface 32 passes proximity sensor 98 whereupon a discreet signal is sent to monitor 102, which provides for monitoring of the wear of the pump while the pump is in operation. An acceptable proximity transducer system, including proximity sensor 98 and monitor 102 is the 7200 Proximitor, available from Kaman Instrumentation Corporation, Colorado Springs, Colorado.

With such constant input of information from the proximity sensor, it is now possible to record the proximity as sensed over a period of time, and thereby to detect changes in the proximity, which indicate wear or imminent failure of the pump before the event occurs, whereupon the complex papermaking process (or other process) can be shut down in an orderly manner, and indeed such maintenance, repair, or rebuild can be efficiently planned.

Figures 4, 6, 7:
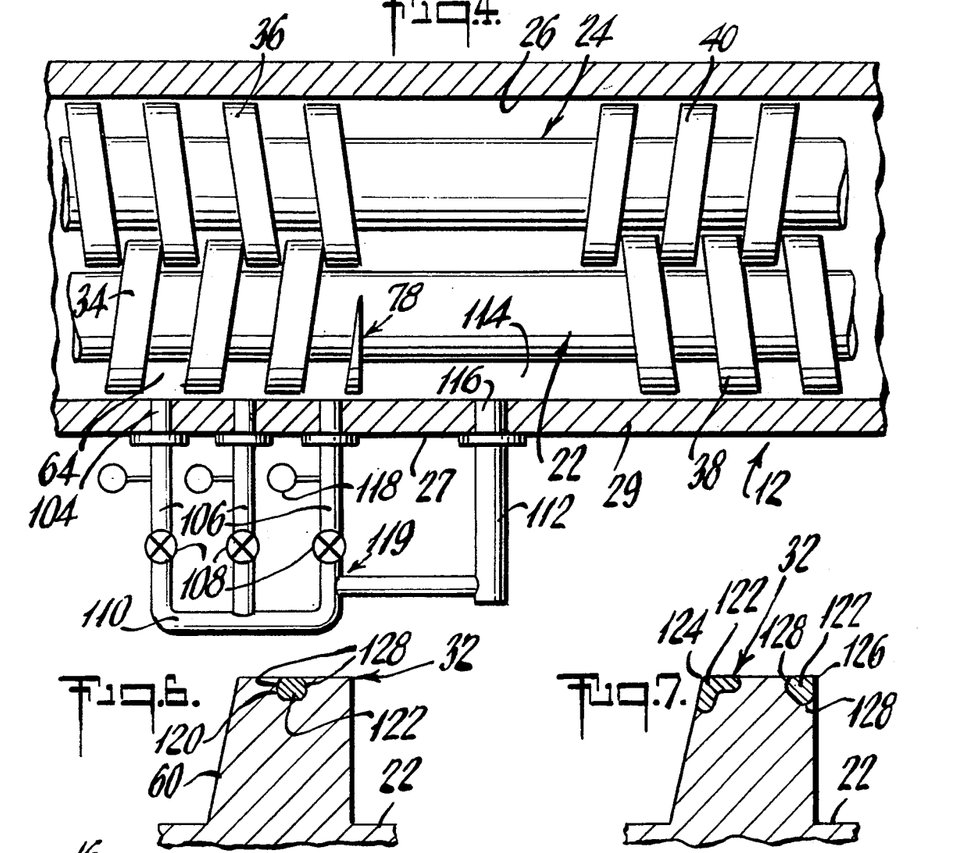
FIG. 4 shows a fragmentary cross-section including a dynamic control system adapted to reducing pressure pulsation by providing control apparatus for controlling the amount of pressure leakage, from the screw outlet area back toward the screw inlet ends.
FIGS. 6 and 7 show fragmentary cross-sections of the screw and illustrate the wear strips on the screw.

Referring now to FIG. 4, there is shown therein a fluid pressure feedback control system comprising fluid pressure receiving ports 104, pipes 106, valves 108, manifold 110, pipe 112, and fluid sending port 116. Fluid pressure receiving ports 104 are similar to wear measurement ports 86 in that they extend through wall 27 of bore 20 to the inner surface 26 of the bore. Ports 104 are typically spaced such that any plurality of fluid pressure receiving ports 104 open into different pumping cells. Ports 104 are connected by pipes 106, through valves 108 and manifold 110 to pipe 112 which is in fluid communication with the high pressure portion 114 of bore 20, through fluid pressure sending port 116. By manipulating valves 108, fluid at the outlet pressure of the pump can be controllably and adjustably fed back into pumping cells, as indicated at pressure gauges 118, whereby the pressure differential between the high pressure portion 114 and the next opening one of the cells can be reduced by building the pressure in the cell before it is fully opened to the outlet pressure at the outlet end of the flight.

Similarly, the higher pressure fluid, and thus the fluid pressure, can also be fed by way of manifold 110, and the respective valve 108, to any or each of the pressure receiving ports 104. The pressure in the respective pumping cells (e.g. 64) can thus be controlled, and increased progressively in a given cell as the fluid traverses the length of the flight, such that the pressure change experienced by the fluid in a cell when the cell opens at outlet end 78 is controlled, and the pressure change upon opening the cell to the outlet pressure can be minimized when desired. And as the pressure change at flight outlet end 78 is reduced, the pressure pulses associated with that pressure change are also reduced, whereby the vibration and resonance caused, in the downstream piping, by such pressure pulses, is reduced. Thus, the pressure feedback system 119 illustrated in FIG. 4 can be effective to reduce the fluid stress, especially the vibration and resonance stress, on the pump and on the piping and other apparatus which is subjected to the output pressure of the pump downstream from the pump.

One pressure feedback system 119 is shown in FIG. 4, for controlling the pressure along flight 34, it being understood that a similar feedback control system is used for each flight in the pump (e.g. 36, 38, and 40).

The resonance, vibration, etc., in the operating system of which the pump is a part, as set up by high speed operation of the several components thereof, can be somewhat accommodated by manipulating the valves 108 to change the intensity and duration of pressure pulses produced by pump 10 in order to provide a dynamic control capability in the dynamic vibration and resonance environment. Further, as vibration and resonance change in the operating system (e.g. in response to changes in pump speed), the control valves can be manipulated to provide the changed optimum amounts of fluid and pressure feed-back.

While the pumps of this invention are designed to operate with a clearance of e.g. 0.02 inches (0.5 min.) between the screws 22, 24 and the bore 20, wherein the screws 22, 24 are supported by bearings 46, 48, 50, 52 near opposing ends thereof, and whereby the screws should never touch the inner surface 26 of bore 20, in actual practice, such touching does occur, in part due to vibration and resonance. In addition, the pumps which applicants contemplate using in paper making processes are large, e.g. major and minor circumferences of 50 inches (127 cm.) and 25 inches (63.5 cm.) respectively, and unsupported distances between bearings 46, 48 and bearings 50, 52, of over 10 feet (3.05 m). A variety of forces apply bending moments on screws 22, 24. For example, the mass of the material in screws 22, 24 encourages a certain amount of sag, in response to gravity, in the middles of the screws, midway between the supporting bearings, centering around the locus of outlet 16. This sag contributes to eccentric rotation of the screw. As the screws rotate, they set up resonance vibrations that contribute to eccentricity of the rotation. Also, as taught in U.S. Pat. No. 2,463,460, the screws tend to shift toward the discharge opening, in a direction transverse to the lengths of the shafts 28, 30, when the pump is operated.

Figure 8:
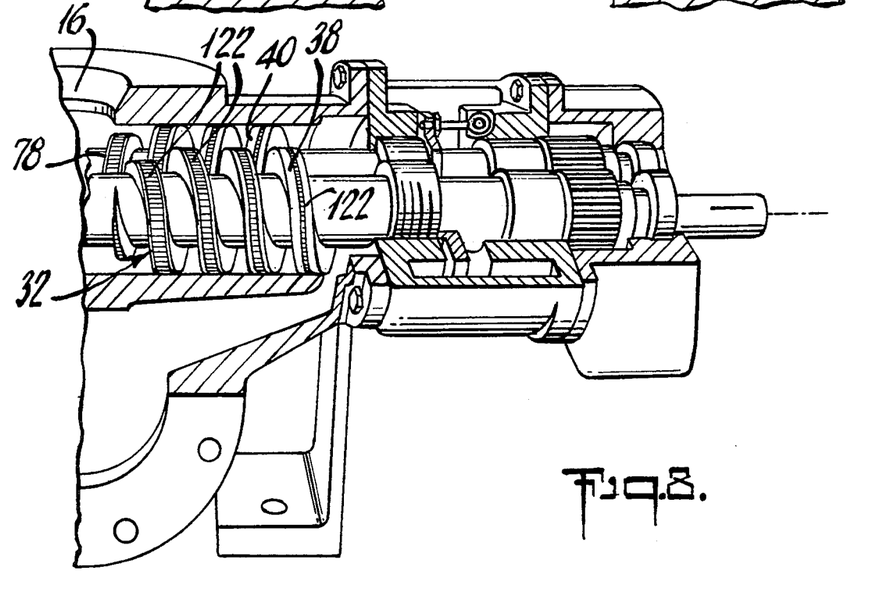
FIG. 8 is a view of the right side of the pump of FIG. 1, showing wear strip variation with respect to position on the screw.

With such forces being applied to the screws 22, 24, the screws do experience some contact between the outer surfaces 32 of the flights and the inner surface 26 of bore 20. The momentum of the impacting contact is, of course, related to the mass of the respective screw and the velocity of the respective movement. Accordingly, outer surface 32 is effectively hardened to reduce the wear of the screw. The hardenings preferred for screws 22, 24 are illustrated in FIGS. 6-8.

In FIG. 6, a groove 120 is cut along the middle of outer surface 32 of the flight, and is filled with a wear hard material 122 such as tungsten carbide or stellite. The wear hard material 122 is mechanically locked in place, against movement in a direction transverse to the longitudinal axis of the shaft 22, by the overlying material at wedge 128. Hard material 122 can be applied, as conventional, with a plasma arc. However, inserting a pre-formed strand of material 122 into a groove 120 is preferred, followed by locking the hard material in place by modest deformation of the surrounding material to secure the lock at wedge 128.

Since substantially less than half of the thickness, overall, of the outer surface 32 of the flight is occupied by the hard material 122, the cost and difficultly of finish grinding outer surface 32, to form a unitary and uniform surface as shown, is commensurately reduced as compared to finish grinding the surface after applying hardening material over the entire width of outer surface 32. The mechanical locking at wedge 128 enables the use of a less expensive pre-formed strip of hard material rather than the conventional more expensive hot melted spray application of hard material as at 43 in U.S. Pat. No. 3,841,805.

Alternative loci and orientations of attachment are shown in FIG. 7, wherein the hard material 122 is shown at the leading and trailing edges 126 and 124 respectively of the outer surface 32, and can be at either or both edges, leading edge preferred. At leading edge 126, the wear hard material 122 is mechanically locked in place, against movement in directions both transverse to the longitudinal axis of the shaft 22 and parallel to the longitudinal axis of the shaft, by the overlying material at wedge 128, similar to the mechanical locking illustrated in FIG. 6. In FIG. 6, approximately half of the hard material 122 will be worn away by the time the mechanical locks of the corresponding wedges 128 are worn away. Similarly, a significant amount of material 122 will be worn away at leading edge 126 before the mechanical locks of the respective wedges 128 are worn away there.

FIG. 8 illustrates varying the width of the hard material 122 along the length of the flight, according to the probable rate of wear at any given locus on the screw. Since the greatest moment arm in the screws is adjacent the outlet, the probabilities for wear are greatest adjacent outlet 16, and become rather progressively less when one moves in the directions toward the supporting bearings. Accordingly, at the outlet ends 78 of the flights 38, 40 the entire outer surfaces 32 thereat are surfaced with hard material 122. As one progresses along flights 38, 40 toward their inlet ends, the fractions of the surfaces 32 which are occupied by the wear hard material 122 become progressively smaller as shown in FIG. 8.

As described above, the pumps of this invention are improved by incorporation of a variety of modifications, each of which can be used alone, or in any combination with the others. Preferably, all the improvements are incorporated into a given pump whereby the cumulative benefits thereof are obtained. Such pumps are improved by introducing some of the fluid at the outlet pressure to an isolated pumping cell prior to completely opening the cell to the outlet pressure, as illustrated in FIGS. 1–4. They are improved by balancing the screws as illustrated in FIGS. 1 and 5, by careful selection of the locus of the balancing holes as illustrated FIG. 1, and by capping, and grinding smooth the caps on the balancing holes as seen in FIGS. 1 and 5. They are improved by providing sensors and monitors to sense and monitor screw wear. They are improved by providing pressure feedback control system 119 which allows dynamic control of the pumping pressure in the isolated pumping cells 72.

Typical materials contemplated to be pumped by pumps of this invention are low viscosity fluids such as water and compositions containing a substantial amount of water. Other materials could, of course, be pumped. A preferred material is a foamed fiber furnish for paper making as disclosed in U.S. Pat. No. 4,443,297 Cheshire et al. Suitable papermaking foamed fiber furnishes contain from about 50 to about 80 percent air by volume. The overall liquid medium contains about 200 to about 500 ppm surfactant, such as the surfactant sold under the trade name Witconate AOS by Witco Corp. New York. Papermaking fiber is dispersed in the foam at a concentration up to about 2% to about 3% by weight.

In the pumping operation, a prime mover such as an electric motor, is coupled with shaft 28 of screw 22 at the right end of the pump (FIG. 1). As the motor rotates shaft 28, the entire screw 22, including flights 34 and 38, rotates, and is supported for rotation in bearings 46, 52, as well as end bearing 130. As screw 22 rotates, engaged gears 56, 58 cause simultaneous rotation of shaft 24 in the opposite direction. Each of the flights 34, 36, 38, 40, are pitched such that the rotation of the respective screw causes material, which is entrapped in pumping cells defined by the flights of the respective screws, to be advanced, in the respective pumping cells, toward the outlet ends 78 of the respective flights, and accordingly, toward the outlet 16 of the pump 10.

Material to be pumped (e.g. three phase foamed fiber furnish) enters the pump at inlet 14 and follows divergent paths to opposing inlet ends 76 of the flights on opposing ends of bore 20. As the screws turn, the material is drawn into bore 20 by the turning screws. As the material enters bore 20, individual units of the material are entrapped in pumping cells 72, where they are isolated from the inlet, from the outlet, and from each other. The isolation is, of course, violated in small part by the ordinary leakage tolerated by the small clearances between the several respective parts of the pump. Continued turning of the screws causes advancement of the pumping cells, and accordingly the liquid entrapped therein, toward the outlet ends 78 of the flight, and ultimately out of the pump at outlet 16.

While the pumps of this invention have been described with respect to pumping water and aqueous foamed liquid dispersions at contemplated conditions, they can clearly be used with other pumpable materials and at other pumping conditions.

Having thus described the invention, what is claimed is:

1. A screw type positive displacement pump comprising:
   (a) an outer casing, said outer casing comprising an inlet, an outlet, and internal passage means adapted for conveying material between said inlet and said outlet;
   (b) interengaging pumping screws, each screw having (i) a minor circumference defined by a shaft, and (ii) a major circumference defined by at least one screw flight, said screw flight having an inlet end and an outlet end, and extending radially about said shaft and longitudinally along said shaft, and outwardly from said shaft, to an outer surface of said flight, a portion of said outer surface being defined in said major circumference; said passage means comprising a bore, adapted to receive a portion of said pumping screw, said bore comprising an inner surface, an outer surface, and a wall therebetween; a first portion of said flight being received in said bore over a length of said screw wherein said bore and said flight are coexistent; clearance between said outer surface of said flight and said inner surface of said bore being sufficiently small for providing an operative pumping seal for pumping material through said bore by said screw; and
   (c) a fluid pressure feedback control system, said control system comprising;

(i) fluid sending port, said sending port being disposed at said outlet end of said flight and extending through said wall of said bore from a first portion of said outer surface of said bore to said inner surface thereof, (ii) a plurality of fluid receiving ports, said receiving ports extending from a second portion of said outer surface of said bore through said wall of said bore to said inner surface of said bore and being disposed at said inner surface of said bore between said inlet end of said flight and said outlet end of said flight, each said receiving port having an inner end thereof at said inner surface of said bore, said receiving ports being spaced such that portions of said flight adjacent said inner surface of said bore are disposed between said inner ends of said receiving ports;

(iii) conduits connecting said receiving ports to said sending port; and (iv) valve means adapted to distribute flow of fluid from said sending port among said receiving ports, said valve means being adapted to control the pressure at each of said receiving ports whereby pressure in the fluid being pumped can be increased progressively during traverse along the length of said flight such that the pressure change experienced by the fluid upon expression of the fluid from said flight at the outlet end thereof is substantially less than the pressure differential between said pump outlet and said inlet end of said screw of the fluid being pumped.

2. The screw pump according to claim 1, wherein two interengaging pumping screws are arranged in parallel to each other for pumping material from said inlet to said outlet.

3. The screw pump according to claim 1, wherein said conduits is a manifold in fluid communication with a conduit for supplying a flow of fluid to said fluid sending port.

4. The screw pump according to claim 1, wherein reducing the differential pressure between an area of the screw pump adjacent to the fluid sending port and an area of the screw pump adjacent to the fluid receiving port reduces pressure pulses which cause vibration and resonance within said screw pump.

5. The screw pump according to claim 1, wherein said interengaging pumping screws are essentially mirror images of each other.

* * * * *

UNITED STATES PATENT AND TRADEMARK OFFICE
CERTIFICATE OF CORRECTION

PATENT NO. : 5,348,453

DATED : September 20, 1994

INVENTOR(S) : Mark E. BARAN, David P. PHIBBS, Vern W. COUCH, and George W. MICHALEC It is certified that error appears in the above-indentified patent and that said Letters Patent is hereby corrected as shown below:

On the Title Page, Column 1, item [60] Related U.S. Application Data, change "Ser. No. 634,455," to -- Ser. No. 633,455 --

Signed and Sealed this

Third Day of January, 1995

*Attest:*

BRUCE LEHMAN

*Attesting Officer*     *Commissioner of Patents and Trademarks*